Patented Sept. 5, 1922.

1,428,120

UNITED STATES PATENT OFFICE.

WILLIAM HENRY SCHEEL, OF MOUNT VERNON, NEW YORK.

COMPOUND FOR HARDENING COMMON ROSIN AND METHOD OF USING SAME.

No Drawing.   Application filed March 25, 1922.   Serial No. 546,932.

*To all whom it may concern:*

Be it known that I, WILLIAM HENRY SCHEEL, a citizen of the United States, and a resident of the city of Mount Vernon, county of Westchester, and State of New York, have invented a new and Improved Compound for Hardening Common Rosin and Method for Using Same, of which the following is a full, clear, and exact description.

My invention relates to a new and improved form of calcium oxide CaO, which I obtain by the calcination of coral, such as found abundantly in undersea deposits as coral reefs. This coral reef formation being a product of animal origin, a calcium carbonate deriving from the calcareous concretions of minute organisms.

By roasting this calcareous concretion in a suitable kiln, at a sufficiently high temperature, the carbonic acid of the said calcium carbonate, $CaCO_3$, is driven off and the result is a calcium oxide, possessing characteristics highly desirable in the treatment of rosin intended to be used during the process of varnish making, in place of the more expensive fossil resins and gums, such as copals.

Common rosin is being used extensively in the varnish-making practice, and would be used far more extensively, were it not for inherent objectionable features that every practical varnish maker is familiar with, namely: 1, its brittleness, 2, its acidity, 3, the tendency of a rosin varnish to lose its high luster and turn white when coming in contact with water.

For the purpose of counteracting these well known drawbacks many attempts have been made to discover suitable compounds capable of combining chemically with rosin. For instance the use of quicklime has been resorted to more or less successfully. While it is true that quicklime acts as a calcium oxide upon rosin forming a lime resinate and thereby neutralizing the acidity, its use presents serious objections such as to cause its rejection, in cases particularly where a clear, translucent varnish is desirable.

I have discovered that in the practice of varnish making, there is a vast difference between the lime such as obtained from limestone and the much whiter and purer material obtainable from the calcination in suitable kilns of the calcareous concretions of animal organisms and particularly coral. Not only do they differ in physical characteristics the coral lime being much cleaner, purer and whiter, but the coral lime, owing to its peculiar structure, which is more like that of infusorial earth, diffuses more readily and the diffused particles combine more completely when agitated in molten rosin and even at a lower temperature; the result being clear and transparent, instead of being milky or cloudy resinate of lime.

I am also aware of the fact that attempts have been made to get less unsatisfactory results in hardening rosin, by the substitution of oyster shell lime in place of the common quicklime such as used as a material for building construction. But it has been found in the practice of hardening rosin and making therefrom cheap rosin varnishes, that the oyster shell lime seldom runs uniform in percentage of pure CaO, it is besides very dark colored and contains impurities such as cartilaginous matter, such that oyster shell lime had to be rejected as a material in a process where cleanliness should be the first consideration as it is the case with varnish making.

To make use of my new and improved compound, coral lime, in hardening rosin, I proceed as follows:—

I melt first the rosin in a round bottom or other suitable iron melting pot, of sufficiently large capacity, using a direct fire, in preference to indirect heat and when the resin has been thoroughly liquefied by heat, I add to it, under constant stirring, one pound of my coral lime compound, in a pulverized form. For facilitating the diffusion and distribution of the pulverized coral lime, I sift it through a fine mesh metallic sieve all over the surface of the liquefied rosin. I have found in practice that only one per cent in weight of the pulverized coral lime is sufficient to harden or neutralize 100 pounds of common rosin, but inasmuch as the various grades of rosin do not run uniform in their degree of acidity, I do not confine myself to the proportions above given. I have found it in practice that it requires about 30 minutes to conduct a batch of 300 lbs. of rosin; that is 30 minutes time are required to cause a perfect chemical combination of the rosin with the coral lime. The use of an iron rod ending at the end with a spatula greatly facilitates the scraping from the bottom of the kettle and precludes sedimental calcination. Having completed the operation after 30 minutes of cooking, the hardened rosin in a liquefied condition is transferred to an adjoining tray or cooling receptacle, where it solidifies in cooling. It is thus ready for use as the gummy or resinous material for the purpose of varnish making and in such manner or in such proportions as the varnish formula calls for or the nature of the varnish may require.

Having thus described my invention, I claim as new and desire to secure by Letters Patent:—

1. A composition of matter consisting of common rosin and coral lime, in the proportion of approximately one per cent of the latter.

2. The method which consists in hardening rosin, by combining it in a molten condition, with coral lime, in a dry powdered form, and in the proportion of approximately one per cent of the latter; said coral lime being distributed through and carried by the said molten rosin under agitation, in a melting kettle then cooking over fire for thirty minutes and finally allowing the hardened rosin to solidify by cooling.

3. The method which consists in compounding coral lime with common rosin in fusion, for the purpose of hardening the rosin first, and then diluting the said rosin compound, while in fusion, with an adequate liquid solvent, to the proper consistency of a rosin varnish.

WILLIAM HENRY SCHEEL